(No Model.) 4 Sheets—Sheet 1.

J. J. COWELL.
MITER MACHINE.

No. 409,455. Patented Aug. 20, 1889.

WITNESSES:
J. J. Laass
W. H. Randall

INVENTOR
Julius J. Cowell
BY
Duell, Laass & Duell
ATTORNEYS (No Model.) 4 Sheets—Sheet 2.

J. J. COWELL.
MITER MACHINE.

No. 409,455. Patented Aug. 20, 1889.

WITNESSES:
J. J. Laass
N. H. Randall.

INVENTOR
Julius J. Cowell
BY
Duell, Laass & Duell
ATTORNEYS (No Model.) 4 Sheets—Sheet 3.

J. J. COWELL.
MITER MACHINE.

No. 409,455. Patented Aug. 20, 1889.

WITNESSES:
J. J. Laass
N. H. Randall

INVENTOR
Julius J. Cowell
BY
Will Laassthur
ATTORNEYS (No Model.) 4 Sheets—Sheet 4.

J. J. COWELL.
MITER MACHINE.

No. 409,455. Patented Aug. 20, 1889.

WITNESSES:
J. J. Laass
W. H. Randall.

INVENTOR
Julius J. Cowell
BY
Duell, Laass & Duell
ATTORNEYS

UNITED STATES PATENT OFFICE.

JULIUS J. COWELL, OF WEEDSPORT, NEW YORK, ASSIGNOR OF TWO-THIRDS TO CHARLES J. BROWN AND CHARLES D. OLNEY, BOTH OF SAME PLACE.

MITER-MACHINE.

SPECIFICATION forming part of Letters Patent No. 409,455, dated August 20, 1889.

Application filed September 27, 1888. Serial No. 286,519. (No model.)

*To all whom it may concern:*

Be it known that I, JULIUS J. COWELL, of Weedsport, in the county of Cayuga, in the State of New York, have invented new and useful Improvements in Miter-Machines, of which the following, taken in connection with the accompanying drawings, is a full, clear, and exact description.

The invention consists in the novel construction and combination of parts, as hereinafter described, and pointed out in the claims.

Figure 1:
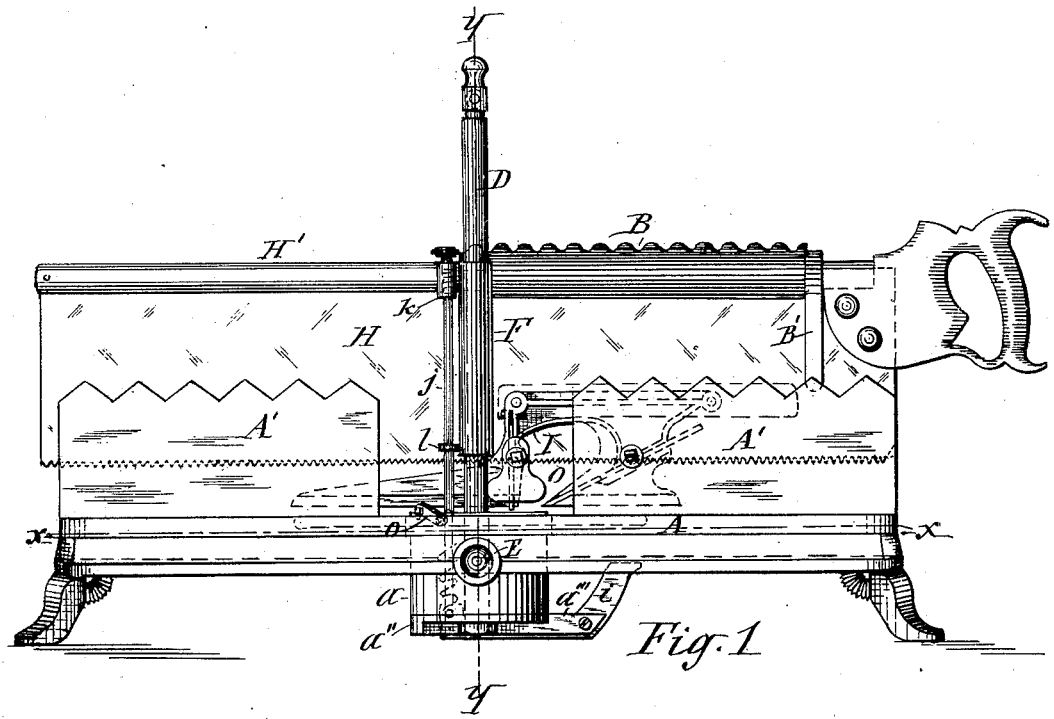
Figure 2:
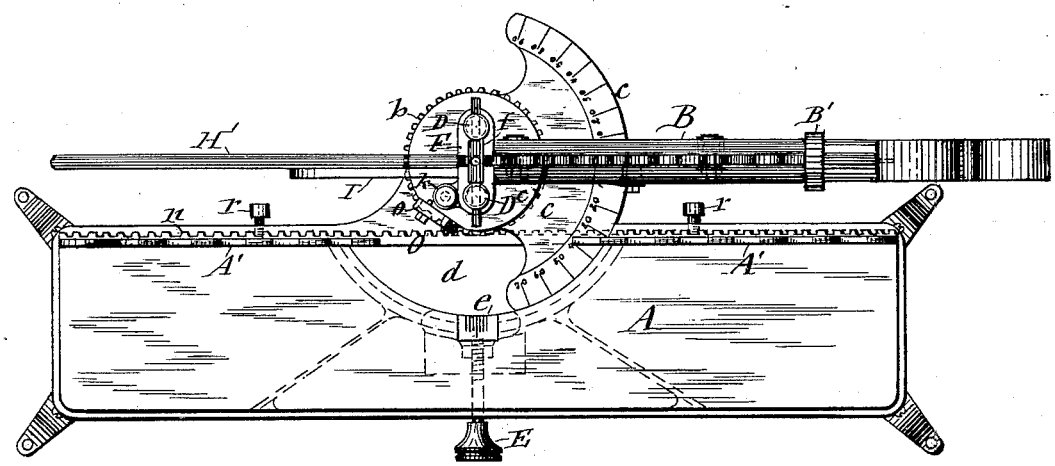
Figures 3, 4:
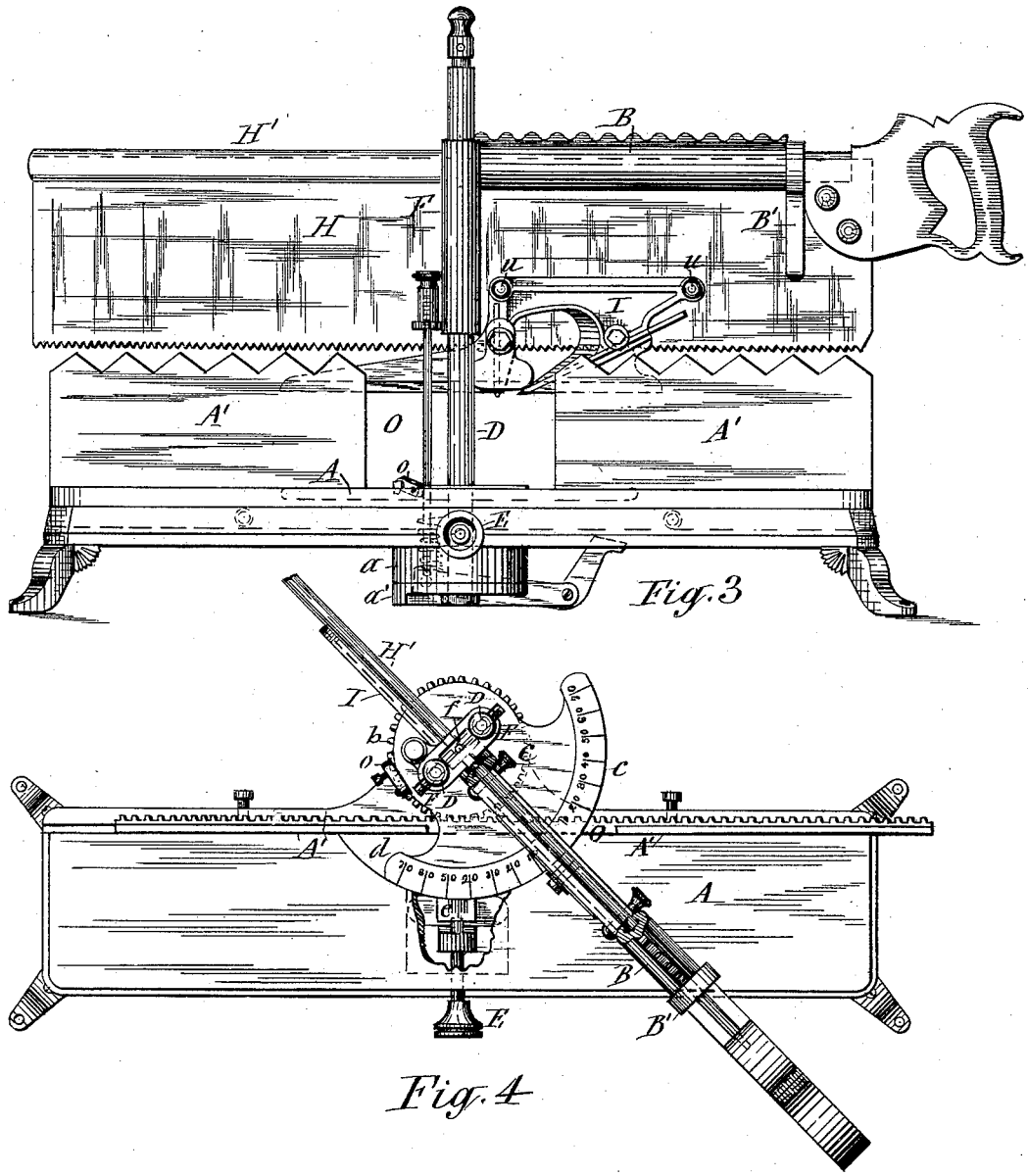
Figure 11:
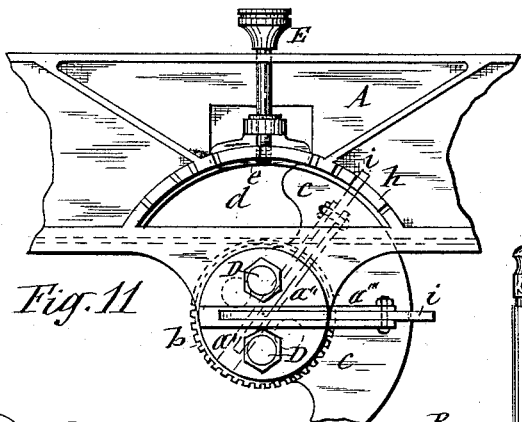
Figures 12, 13:
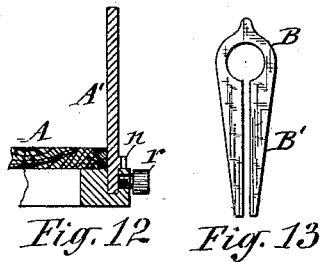
Figure 5:
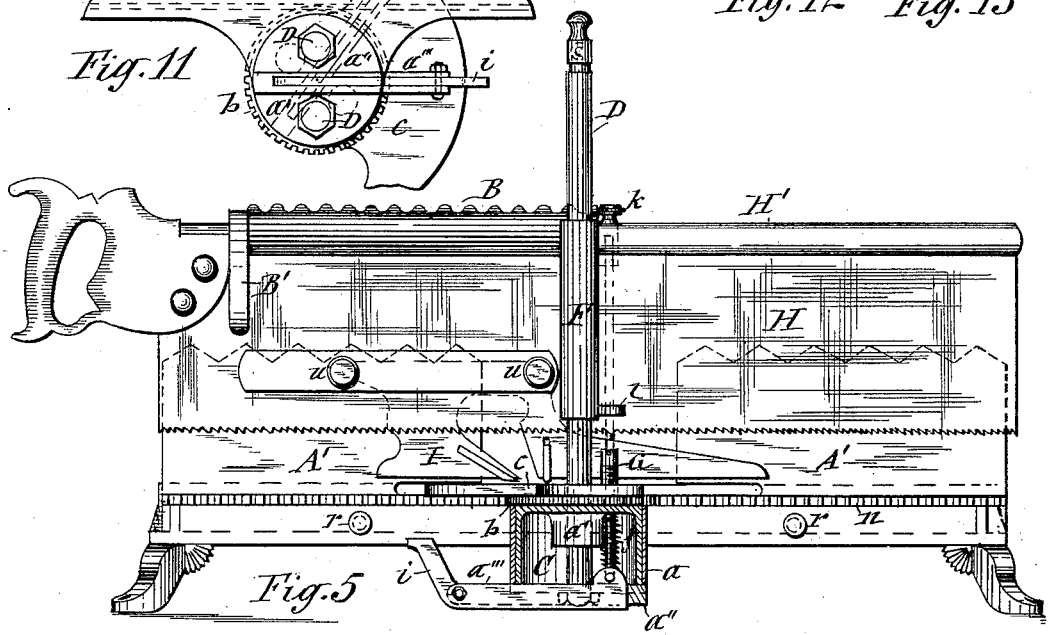
Figure 6:
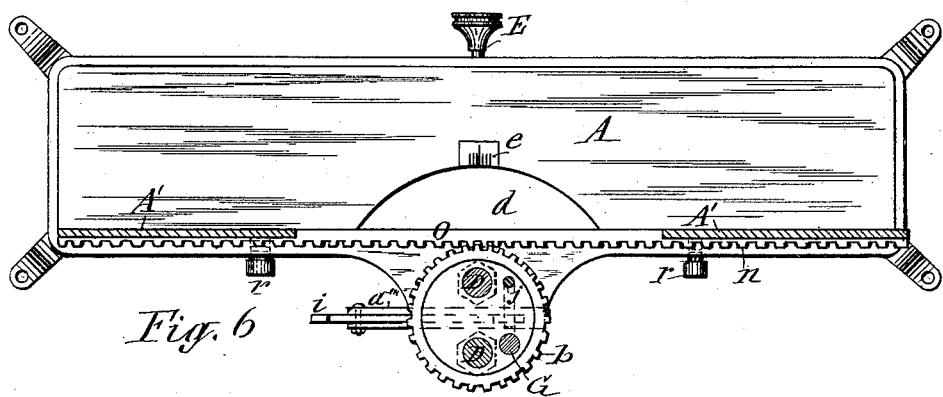
Figure 7:
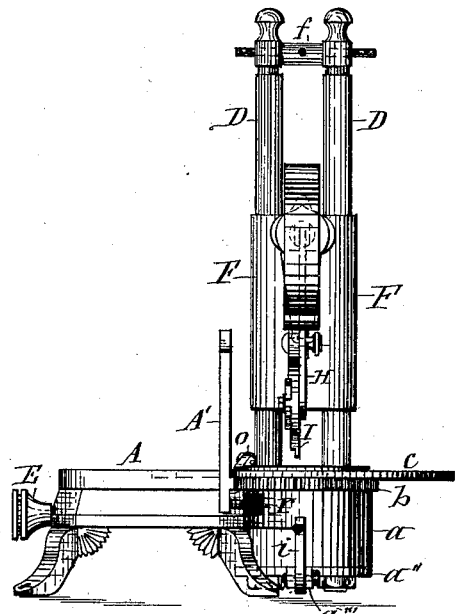
Figure 8:
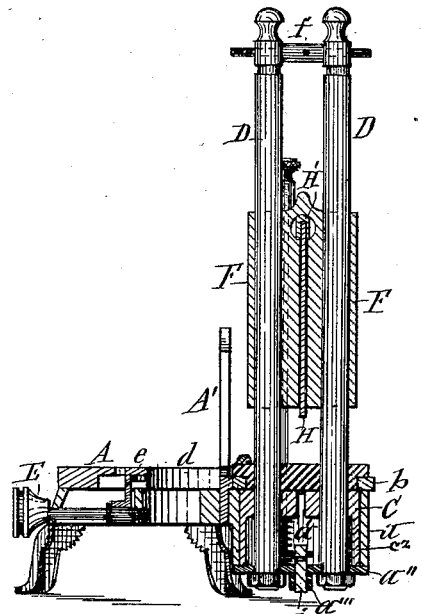
Figure 9:
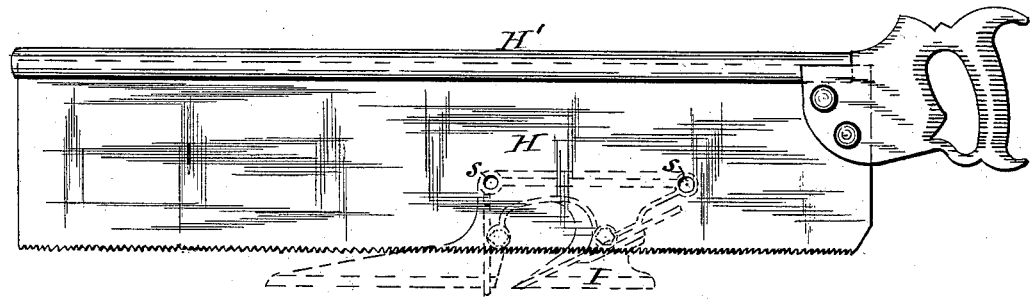
Figure 10:
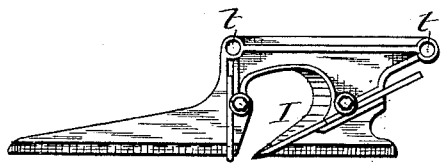

In the annexed drawings, Figure 1 is a front elevation of a miter-machine embodying my invention, the saw being in the position in which it is placed when not in use. Fig. 2 is a top plan view of the same. Fig. 3 is a front elevation showing the saw partly elevated preparatory to swinging the same into its operative position. Fig. 4 is a top plan view showing the same in its operative position. Fig. 5 is a rear elevation of the machine, with the step or socket for the pivoted saw-guide support shown in vertical transverse section. Fig. 6 is a horizontal transverse section on line $x\,x$, Fig. 1. Fig. 7 is an end view of the machine. Fig. 8 is a vertical transverse section on line $y\,y$, Fig. 1. Figs. 9 and 10 are detached side views of the saw and plow adapted to be attached to said saw. Fig. 11 is an inverted plan view of that portion of the machine to which the saw-guide support is pivoted. Fig. 12 is a vertical transverse section of that portion of the bed which is provided with a clamp for confining the breast in its position, and Fig. 13 is an end view of the saw-guide.

Similar letters of reference indicate corresponding parts.

A represents the bed upon which to place the work or article to be operated on, and A' is the breast which rises from the bed and against which the work or article to be operated on is made to rest during the operation of cutting the miter, said breast being provided with a central opening O, through which to operate the saw or cutter.

B represents a saw-guide, which I mount movable vertically on a vertically-pivoted support, which allows the saw to be set longitudinally at different angles in relation to the breast A'. The form of said saw-guide support is susceptible of many modifications, and I therefore do not wish to limit myself in this respect. The essential features of said support are its vertical pivot, which allows it to turn, and the saw-guide, adapted to slide vertically on said support and turning with it. However, I prefer the following construction: From the bed A at the rear of the breast A' projects rigidly a vertical step or socket $a$, in which is pivoted a hollow hub C, having a depending annular shoulder $c^2$. To said hub are firmly secured two smooth vertical posts D D, the attachment of which I preferably effect by passing the lower ends of said posts through tubular bosses $a'\,a'$ on the interior of the hub and through a cap $a''$ on the open lower end of the hub. A vernier-plate $c$, rigidly attached to the posts above the step or socket, as hereinafter described, and nuts on the protruding ends of the posts at the bottom of the cap $a''$, serve to retain the hub in the socket and sustain the posts D D in a vertical position and rotatable in the socket. The under side of the vernier-plate $c$ is formed with a hub, which is concentric with the socket $a$, and on this hub is loosely pivoted a ring-pinion $b$, so as to allow the latter to turn independently of the vernier-plate. The vernier-plate is made to turn synchronously with the two posts D D by the latter passing through said vernier-plate, the bed A being provided with a segmental excision $d$, for the reception of the aforesaid vernier.

In a notch in the bed A, at the edge of the excision $d$, is a graduated block $e$, by which to set the vernier according to the angle of the miter to be cut. The block $e$ is arranged movable toward and from the excision or opening $d$, and is connected with an adjusting-screw E, engaged horizontally underneath the bed A, and by means of this screw the aforesaid block can be forced toward the excision or opening $d$ and made to clamp the vernier $c$ in its position when desired. This clamping device, however, is only employed for a very accurate adjustment of the vernier. Aside from this clamping device I employ other means for retaining the pivoted saw-guide support in its required position, as will be hereinafter explained.

On the posts D D slide vertically two sleeves F F, which are rigidly united at their upper ends and have rigidly and horizontally projecting from them the saw-guide B, which consists of a horizontally-tubular arm having at its free end a downwardly-projecting finger B', and provided with a longitudinal slit through its bottom portion and through the aforesaid finger. The saw H, which slides longitudinally in the aforesaid guide, is provided on its top with a longitudinal rib H', which enters the tubular arm, the blade of the saw passing through the slit of the arm and its before-described finger.

In order to allow the posts D D to be properly tightened in the sleeves F F, when required, I provide the upper ends of said posts with right and left screw-threaded orifices, in which works a right and left screw $f$. By turning this right and left screw the upper ends of the posts can be drawn together and thus made to clamp the sleeves between them.

G denotes an adjustable stop for limiting the descent of the saw, said stop being preferably of the form of a screw tapped in the top of the heel of the vernier-plate directly under the lip or projection $l$ on one of the sleeves F, so as to come in contact with said projection, and adapted to be raised and lowered according to the depth of cut to be allowed the saw.

The under side of the bed A has rigidly affixed thereto, or formed integral therewith, a rack $h$, and to an arm $a'''$ projecting from the cap of the socket $a$ is pivoted a dog $i$, which is adapted to engage the aforesaid rack and thereby retain the pivoted saw-guide support in its position. To the said dog is connected a vertical rod $j$, which passes through the heel of the vernier-plate and through a lip $l$ projecting from the sleeves F F, and is provided above the said lip with a head $k$, the said head being sustained at such an elevation by the aforesaid rod that in raising the saw-guide B to its utmost elevation the aforesaid lip $l$ encounters the under side of the head $k$, and thereby trips the dog $i$ so as to cause it to release the rack $h$, and thus allow the saw-guide to freely swing to any desired angle in relation to the breast A'.

In order to allow the breast A' to be shifted longitudinally on the bed A, so as to bring the central aperture of said breast in proper position to allow the saw to be operated through it at the various angles of the miter to be cut, I mount said breast movably longitudinally on the bed. This shifting of the aforesaid breast I effect automatically with the swinging of the saw into its requisite angle by securing to or forming integral with the breast A' a rack $n$, extending lengthwise thereof, and with this rack engages the pinion $b$, hereinbefore described.

To the vernier-plate $c$, I pivot a dog $o$, which is adapted to engage the pinion $b$, and thus lock the same so as to rotate with the pivoted saw-guide support. When the said dog is thrown out of its engagement, the aforesaid saw-guide support can rotate independently of the pinion, and thus the breast A' may remain stationary while turning the saw-guide support on its pivot when desired.

$r$ $r$ denote set-screws which are inserted in the rear of the bed A and are adapted to engage the base of the breast A' when desired to clamp the same in its position.

I represents a plow or channeling-tool which is detachably connected to the saw-blade by the latter being provided with perforations $s$ $s$, as represented in Fig. 9 of the drawings, and the plow I being provided with perforated ears $t$ $t$, coinciding with the perforations $s$ $s$ of the saw, and clamping-screws $u$ $u$, passing through the said perforated ears of the plow and perforations of the saw so as to clamp the said parts together. By this means I am enabled to employ interchangeably the saw and plow or channeling tool.

Having described my invention, what I claim as new, and desire to secure by Letters Patent, is—

1. In combination with the bed and breast rising therefrom, a vertical socket projecting from the bed at the rear of the breast, a hub pivoted in said socket, posts secured to the said hub, sleeves sliding on the posts, and a saw-guide extended horizontally from said sleeves, consisting of an arm constructed to retain a saw in place during the operation, substantially as described and shown.

2. In combination with the two posts, two sleeves rigidly united and sliding, respectively, on the two posts, and the saw-guide extended horizontally from said sleeves, a right and left screw connecting the upper ends of the posts, substantially as and for the purpose set forth.

3. In combination with the bed, pivoted saw-guide support, and the saw-guide mounted movable vertically on said support, a rack on the under side of the bed, a dog connected to the aforesaid pivoted support and adapted to engage the rack, and a rod projecting vertically from the said dog and provided with a catch adapted to engage the saw-guide in its vertical movement, and thereby throw the dog out of engagement, substantially as set forth.

4. In combination with the bed and breast rising therefrom, a vertically-pivoted saw-guide support, a vernier concentric with the pivot of said support and turning synchronously therewith, and a clamp having a sliding engagement with the bed for engaging the vernier, as and for the purpose specified.

5. In combination with the bed and breast rising therefrom, a vertical socket projecting from the bed at the rear of the breast, a hub pivoted in said socket, posts secured to said hub, a vernier secured to the hub by the said posts, sleeves sliding on the posts, and a saw-guide extending horizontally from said sleeves, substantially as described and shown.

6. In combination with the bed, a breast rising therefrom and movable longitudinally thereon, a rack on said breast lengthwise thereof, a vertically-pivoted saw-guide support, and a pinion adapted to rotate with said support and engaging the aforesaid rack, substantially as and for the purpose set forth.

7. In combination with the bed, a breast rising therefrom and movable longitudinally thereon, a rack on said breast lengthwise thereof, a vertically-pivoted saw-guide support, a pinion pivoted concentric with the pivot of said support and engaging the aforesaid rack, and a dog adapted to lock the pinion to the pivoted saw-guide support, and thereby cause said parts to turn simultaneously, substantially as described.

8. In combination with the bed and breast rising therefrom, a vertical socket fixed to and projecting from the bed at the rear of the breast, a hub pivoted in said socket, posts rigidly secured to said hub, united sleeves sliding on said posts, and a saw-guide extending horizontally from said sleeves, consisting of an arm adapted to embrace the back of a saw and hold it in position during operation, substantially as described.

In testimony whereof I have hereunto signed my name, in the presence of two witnesses, at Syracuse, in the county of Onondaga, in the State of New York, this 24th day of September, 1888.

JULIUS J. COWELL. [L. S.]

Witnesses:
J. J. LAASS,
C. H. DUELL.